(12) United States Patent
Hasslacher et al.

(10) Patent No.: US 10,914,221 B2
(45) Date of Patent: Feb. 9, 2021

(54) METHOD AND DEVICE FOR EMISSION MONITORING OF A COMBUSTION ENGINE IN A MOTOR VEHICLE

(71) Applicant: Robert Bosch GmbH, Stuttgart (DE)

(72) Inventors: Oliver Hasslacher, Weissach (DE); Ulrich Gerstung, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 16/239,086

(22) Filed: Jan. 3, 2019

(65) Prior Publication Data
US 2019/0226383 A1 Jul. 25, 2019

(30) Foreign Application Priority Data
Jan. 24, 2018 (DE) .................... 10 2018 201 075

(51) Int. Cl.
*F01N 11/00* (2006.01)

(52) U.S. Cl.
CPC ............ *F01N 11/007* (2013.01); *F01N 11/00* (2013.01); *F01N 2560/02* (2013.01); *F01N 2900/08* (2013.01); *F01N 2900/10* (2013.01); *F01N 2900/102* (2013.01); *F01N 2900/12* (2013.01); *F01N 2900/1402* (2013.01)

(58) Field of Classification Search
CPC .... F01N 11/00; F01N 11/007; F01N 2240/20; F01N 2560/02; F01N 2900/08; F01N 2900/10; F01N 2900/102; F01N 2900/12; F01N 2900/1402; G01M 15/102
See application file for complete search history.

(56) References Cited

U.S. PATENT DOCUMENTS

| | | | | |
|---|---|---|---|---|
| 5,941,918 A | * | 8/1999 | Blosser | F01N 13/008 701/31.7 |
| 6,721,649 B2 | * | 4/2004 | Knott | G01M 15/102 340/632 |
| 9,938,908 B2 | * | 4/2018 | Li | F02D 11/02 |
| 2001/0002550 A1 | * | 6/2001 | Zhang | F02D 41/1463 73/114.75 |
| 2011/0202253 A1 | * | 8/2011 | Perry | F01N 3/101 701/102 |

(Continued)

FOREIGN PATENT DOCUMENTS

| | | | | |
|---|---|---|---|---|
| EP | 2033832 A1 | * | 3/2009 | ............... G07C 5/06 |
| EP | 2033832 A1 | | 3/2009 | |

(Continued)

*Primary Examiner* — Matthew T Largi
(74) *Attorney, Agent, or Firm* — Norton Rose Fulbright US LLP; Gerard Messina

(57) ABSTRACT

A method for monitoring pollutant emissions during the operation of a combustion engine and/or an exhaust-aftertreatment device in a motor vehicle includes determining one or more pollutant-limit values for one or more pollutant categories using an emission limit-value model and as a function of one or more operating-state variables of the motor vehicle; ascertaining a pollutant-concentration variable for each pollutant category using sensors; and detecting an error in the form of an exceeding of the one or the plurality of pollutant-limit vales as a function of the pollutant-concentration variable for each pollutant category.

14 Claims, 2 Drawing Sheets

(56) References Cited

U.S. PATENT DOCUMENTS

2011/0257863 A1\* 10/2011 Hasslacher ............. F01N 11/00
                                                                701/99
2014/0156175 A1\* 6/2014 Young ................... B60W 50/14
                                                                701/110

FOREIGN PATENT DOCUMENTS

WO            045604 A1    1/2004
WO    WO-2012045604   \* 12/2012

\* cited by examiner

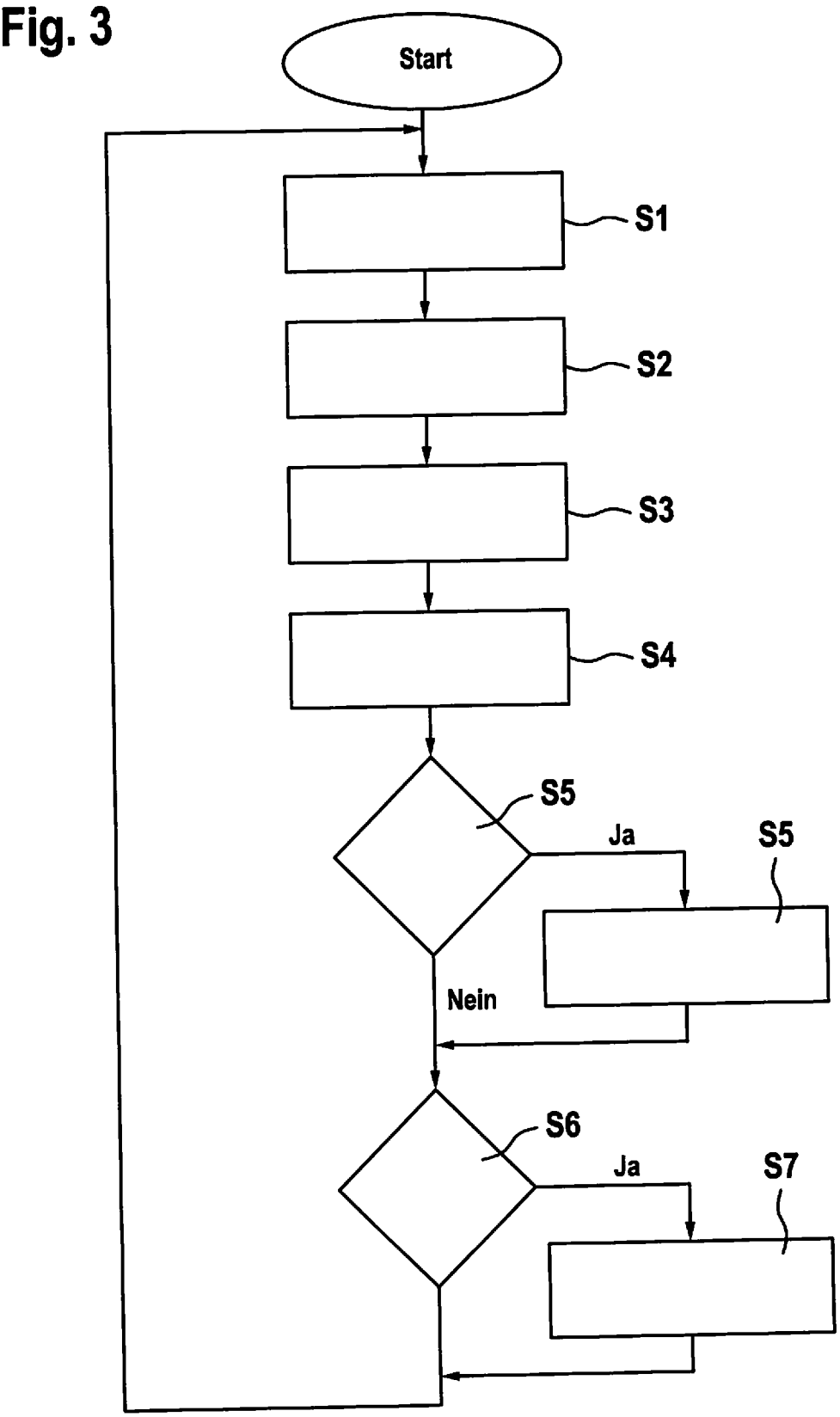

METHOD AND DEVICE FOR EMISSION MONITORING OF A COMBUSTION ENGINE IN A MOTOR VEHICLE

CROSS-REFERENCE TO RELATED APPLICATIONS

The present application claims priority under 35 U.S.C. § 119 to DE 10 2018 201 075.7, filed in the Federal Republic of Germany on Jan. 24, 2018, the content of which is hereby incorporated by reference herein in its entirety.

FIELD OF THE INVENTION

The present invention relates to motor vehicles having combustion engines, and in particular to measures for monitoring exhaust emissions.

BACKGROUND

When combustion engines are in operation, they produce combustion gases whose composition can change as a function of control functions and parameters of the operation of the combustion engine as well as a possible exhaust-gas aftertreatment. The control functions and parameters for the operation of the combustion engine are normally configured in such a way that pollutants in combustion gases, such as nitrogen oxide and soot particles, do not exceed limit values mandated by statutory emission regulations. Additional measures for ensuring compliance with the specified limit values at present include measuring the emissions of a combustion engine on a test stand or installing portable measuring equipment in the vehicle in road traffic. As a further measure, the control functions and the parameterization are checked for manipulations that could lead to exhaust emissions that lie outside the limit values of the statutory emission specifications.

WO/045604 A1 describes a method for assessing emissions in the exhaust gas of an internal combustion engine of a motor vehicle. To exclude subjective influences during the evaluation to the greatest extent possible, it is provided to select an operating state to be evaluated, at least one evaluation variable, and at least one corresponding evaluation reference for the evaluation variables, to carry out at least one measurement of the emissions, to ascertain at least one statistical numerical value from the measurement, to compare the statistical numerical value to the evaluation reference, and to carry out a qualitative and/or a quantitative evaluation of the emissions on that basis.

EP 2 033 832 A1 describes a method and a device for displaying emissions of a motor vehicle, which includes at least one sensor that measures emissions or from whose sensor values the emissions are able to be ascertained; an evaluation and control unit; and a display unit on which the emissions are displayed, the temporal characteristic of the emissions being displayed on the display unit for a predefined period of time.

SUMMARY

Example embodiments of the present invention are directed to a method is provided for monitoring pollutant emissions while a combustion engine in a motor vehicle is operated, to a corresponding device, and to a corresponding engine system.

According to an example embodiment of the present invention, a method for monitoring pollutant emissions during the operation of a combustion engine and/or an exhaust-aftertreatment device includes: determining one or a plurality of pollutant-limit value(s) for a pollutant category or for a plurality of pollutant categories with the aid of a provided emission limit-value model as a function of one or a plurality of operating-state variable(s) of the motor vehicle; ascertaining a pollutant-concentration variable for each of the pollutant categories with the aid of sensors; and determining an error if an exceeding of one or a plurality of predefined limit value(s) is detected as a function of the pollutant-concentration variable for each pollutant category.

In particular, the one limit value or the plurality of limit values can encompass one or a plurality of pollutant-limit value(s).

In an example embodiment, a mathematical emission limit-value model is provided, which is operated in a data-processing device in the motor vehicle and ascertains one or a plurality of pollutant-limit value(s) as a function of operating-state variables of the combustion engine and/or an exhaust-aftertreatment device. The pollutant-limit values predefined by the emission limit-value model are specified in such a way that compliance with statutory emission specifications takes place. In addition, the one or the plurality of pollutant-limit value(s) is/are compared to emission values that are based on measurements. The emission values are checked by the pollutant-limit values of the emission limit-value model, and if a pollutant-limit value is exceeded by the corresponding emission value, then an error will be signaled.

In this way it can be ensured that the combustion engine and the exhaust-aftertreatment device as well as their controls are operated so that the pollutant emissions correspond to the permitted statutory emission specifications. Because of the considerable risk of a manipulation of control functions and a parameterization of the control functions for the combustion engine and/or the exhaust-aftertreatment device, complete monitoring of the proper functions as a function of the operating state is no longer possible. The emissions are therefore monitored on the basis of the sensor-acquired measured variables which indicate pollutant concentrations in the combustion gas. As a result, a check that is independent of the operation of the combustion engine and/or the exhaust-aftertreatment device is able to be provided during the operation of the motor vehicle. In particular, potential misuse through a manipulation of control functions and operating parameters for operating the combustion engine and/or the exhaust-aftertreatment device is able to be detected in this manner.

The above method is able to be executed in the motor vehicle on a permanent basis and can be specified, independently of changes in the software of the controls, by the control functions and operating parameters.

In addition, the one or the plurality of operating-state variable(s) for determining the one or the plurality of pollutant-limit value(s) for the pollutant category or for the plurality of pollutant categories can include a vehicle velocity and/or an ambient-air pressure and/or an engine temperature.

In an example embodiment, the one or the plurality of pollutant-limit value(s) for the pollutant category or for the plurality of pollutant categories is determined based on the driving distance. Pollutant-limit values based on the driving distance can correspond to statutory specifications.

In particular, it is possible to determine one or a plurality of driving-distance-based emission value(s) for each pollutant category, and to determine an error when the one or the plurality of pollutant-limit value(s) is exceeded by the corresponding distance-based emission value. This makes it possible to compare the emission values and the pollutant-limit values to each other.

In addition, the one or the plurality of driving-distance-based emission values for each pollutant category is able to be determined through an integration across a period of time required by the motor vehicle to travel a predefined driving distance.

In an example embodiment, an error is detected when a gradient of the pollutant concentration or the emission value of at least one of the pollutant categories exceeds an individually predefined gradient-limit value in terms of its absolute amount.

In particular, the gradient-limit value is able to be fixedly predefined or to be predefined as a function of operating-state variables of the motor vehicle.

In addition, an error signal can be generated when an error is detected, the error signal being stored, in particular together with associated operating-state variables, or being signaled in some other manner.

According to an example embodiment, a device for monitoring pollutant emissions during an operation of a combustion engine and/or an exhaust-aftertreatment device in a vehicle is provided, which is configured to determine one or a plurality of pollutant-limit value(s) for a pollutant category or for a plurality of pollutant categories with the aid of a provided emission limit-value model as a function of one or a plurality of operating-state variable(s) of the motor vehicle; ascertain a pollutant-concentration variable for each pollutant category with the aid of sensors; and detect an error in the form of an exceeding of the one or the plurality of pollutant-limit value(s) as a function of the pollutant-concentration variable for each pollutant category.

Example embodiments will be described in greater detail in the following text with the aid of the appended drawings.

BRIEF DESCRIPTION OF THE DRAWING

FIG. 3 is a flowchart illustrating a method for monitoring pollutant emissions of a combustion engine in a motor vehicle, according to an example embodiment of the present invention.

DETAILED DESCRIPTION

Figure 1:
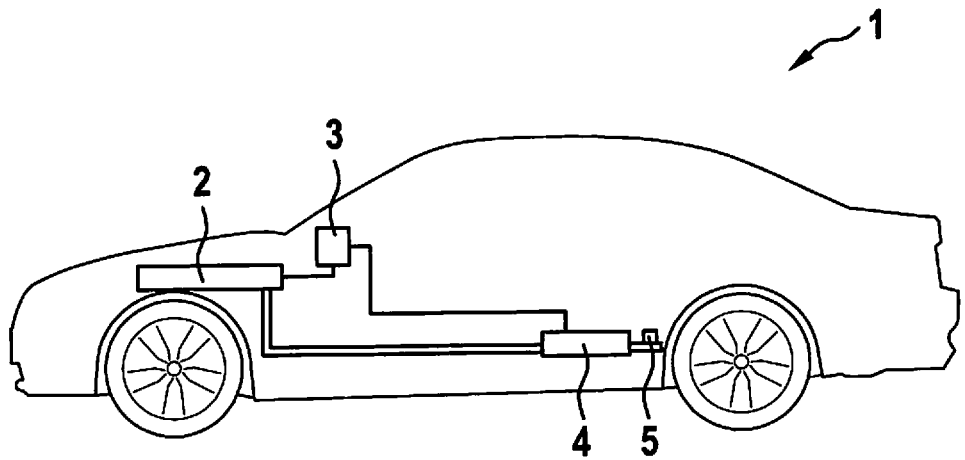
FIG. 1 is a schematic representation of a motor vehicle having a control unit for a combustion engine and an exhaust-aftertreatment device, according to an example embodiment of the present invention.

FIG. 1 shows a schematic illustration of a motor vehicle 1 having a combustion engine 2, which is operated by a control unit 3 (or also a plurality of control units). Combustion engine 2 can be developed as an Otto engine or a Diesel engine and emits combustion gases during its operation, which are purified and/or converted in an exhaust-aftertreatment device 4 in order to reduce the pollutant content in the combustion gas.

The operation of combustion engine 2 and exhaust-aftertreatment device 4 is determined by control unit 3 according to predefined control functions and adjustable operating parameters.

Control functions and operating parameters are predefined by a control software, which is to be developed so that the pollutant emissions in the expelled combustion gas in the normal case lie within limit values mandated by law.

In addition, the exhaust-gas system of motor vehicle 1 is provided with one or a plurality of sensor(s) 5 in order to measure a pollutant concentration of a specific pollutant in the combustion gas on the output side of exhaust-aftertreatment device 4, in particular, and to make it available as the pollutant-concentration variable. The pollutant-concentration variable can indicate a nitrogen-oxide concentration or a soot-particle concentration in the combustion gas, for instance.

Figure 2:
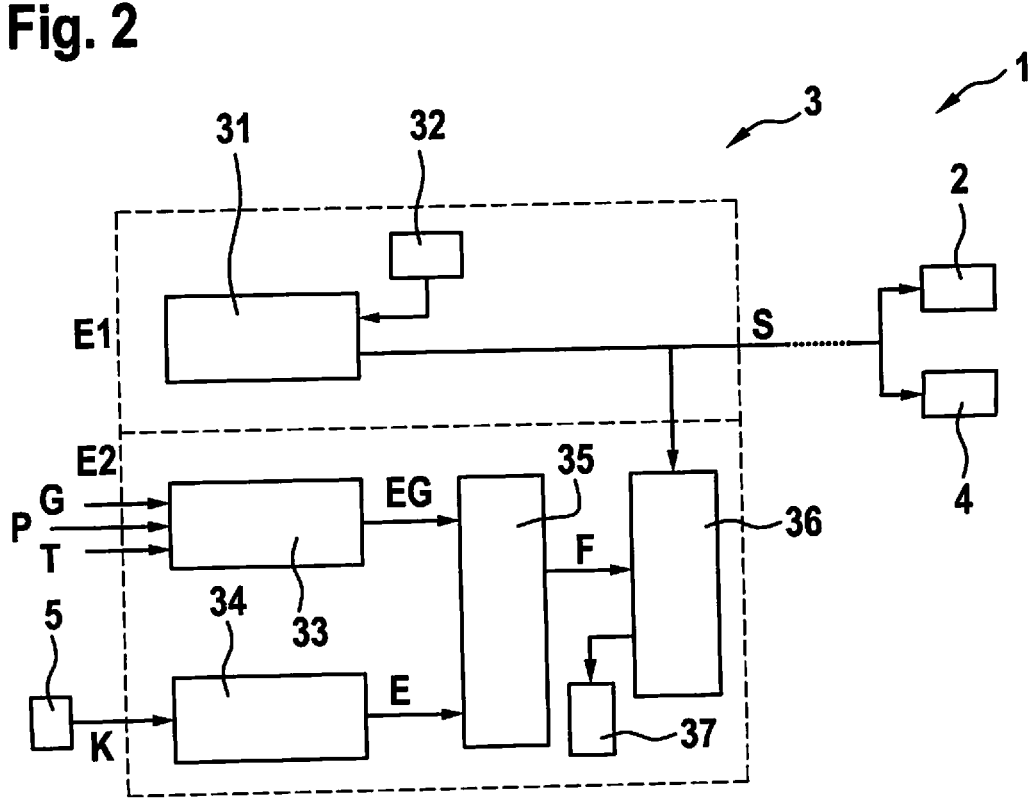
FIG. 2 is a function diagram of control functions realized by a control unit according to a multi-level concept, according to an example embodiment of the present invention.

FIG. 2 shows a schematic illustration of a function diagram of control functions that are implemented in control unit 3 in the form of software. Illustrated control unit 3 has a multi-level safety concept, levels E1, E2 including software functions that are operated independently of one another. Level E1 includes a control-function block 31, which accesses operating parameters stored in a parameter memory 32 in order to carry out control functions of motor vehicle 1.

The above control functions relate to all functions that are relevant for the operation of combustion engine 1, such as fuel metering, air supply, special functions and the like, and functions required for operating exhaust-aftertreatment device 4, such as specifying regeneration cycles and similar matters, and outputting corresponding control variables S to actuators or corresponding devices of combustion engine 2 and/or exhaust-aftertreatment device 4. Control variables that pertain to exhaust-aftertreatment device 4 can include, for example, an added quantity or urea for reducing the nitrogen oxide and the like.

Control variables S are also conveyed to level E2 of the software functions. The software functions of level E2, implemented independently of level E1, include a calculation of one or a plurality of pollutant-limit value(s) (in accordance with the monitored pollutant categories such as nitrogen oxide, soot particles and the like) in an emission limit-value model block 33, which calculates an emission limit-value model based on operating-state variables. Operating-state variables, for example, can include a vehicle velocity G, an ambient-air pressure P, and an engine temperature T. Additional operating-state variables for determining emission-limit values with the aid of the emission limit-value model are also able to be taken into account.

Because the emission limit-value model defines the one or the plurality of pollutant-limit value(s) EG with regard to a driven traveled driving distance, as required by the statutory emission specifications, an integration block 34 is provided in order to integrate the one or the plurality of pollutant-concentration variable(s) K so that the previously volume-based pollutant-concentration variables K are converted into corresponding emission values E based on a traveled distance. The time period of the integration results from the time period required by vehicle 1 during its operation to travel a predefined driving distance, such as 1 kilometer, 10 kilometers, 100 kilometers, for instance. It is also possible to provide a plurality of pollutant-limit values based on different driving distances for a pollutant category. This makes it possible to compare the respective emission values E with the corresponding pollutant-limit values EG determined with the aid of the emission limit-value model.

Pollutant-limit values EG and the emission values E based on the driven distance are conveyed to a monitor block 35, which checks each of the emission values to determine whether it exceeds the associated pollutant-limit value EG. If this is the case, then an exceeding of a pollutant-limit value is signaled to a monitoring unit 36.

In addition, monitor block 36 receives control variables S of the control function from level E1 of the software functions and monitors them for plausibility in a manner known per se.

In addition to monitoring the limit values, monitor block 35 plausibilizes emission values E by monitoring them for physically implausible abrupt changes. Gradient monitoring is implemented for this purpose, which monitors the changes/gradients of emission values E with regard to a gradient-limit value specified for each one of the pollutant categories and supplies an error signal F signaling a corresponding error to monitor block 36 if the predefined gradient-limit value is exceeded. The gradient limit value can be fixedly predefined or can depend on operating-state variables of combustion engine 2 and/or exhaust-aftertreatment device 4.

Error memory 37 stores error signals F for each of the pollutant categories. In addition, it is possible to store operating-state variables that indicate a driving situation during which the error has occurred with an allocation to the error signal. In addition, the change in the operating-state variables prior to and following the occurrence of the error is storable. This makes it possible to carry out an analysis after the fact by reading out error memory 37. In the process, the operating-state variables allocated to the error can be used for identifying the software function or the operating parameters that is/are responsible for the exceeding of the pollutant-limit values.

FIG. 3 is a flowchart illustrating the monitoring method carried out at level E2. For this purpose, one or a plurality of pollutant-concentration variable(s) K is acquired in step S1 using sensor 5 and converted in step S2 into emission values E that are a function of the traveled distance. This is accomplished by integrating the pollutant concentrations ascertained via sensors 5 for a period of time during which the motor vehicle travels a certain distance, such as 1 km. The result is emission values E, which are a function of the driving distance.

In addition, based on state variables such as vehicle velocity G, ambient pressure P, engine temperature T, and the like, it is possible to ascertain pollutant-limit values for the measured pollutant categories using a predefined emission limit-value model.

In step S4, emission values E are checked in order to ascertain whether they exceed a pollutant-limit value EG specified by the emission limit-value model. If this is the case (alternative: yes), an error signal will be generated in step S5, which is stored in error memory 37. In addition, associated operating-state variables allocated to error signal F are able to be stored. In the other case, the present method is directly continued with step S6.

In a next step S6, it is checked whether a temporal change (gradient) of an emission value E is present that is greater than a gradient-limit value specified for the particular pollutant category in terms of its absolute amount. If the predefined gradient-limit value is exceeded (alternative: yes), then an error signal F will also be generated in step S7 and an item of error information is stored accordingly in the monitoring function. Moreover, associated operating-state variables allocated to error signal F can be stored. The method then returns to step S1.

Using the above method, errors of the software-implemented control functions and the operating parameter provided toward this end are able to be detected while motor vehicle 1 is being operated, and more specifically, a manipulation of the software functions in control unit 3 can be detected.

What is claimed is:

1. A method for monitoring pollutant emissions during operation of at least one of a combustion engine and an exhaust-after-treatment device in a motor vehicle, the method comprising:
for each of at least one pollutant category:
based on at least one operating-state variable of the motor vehicle, determining a respective pollutant-limit value using a provided emission limit-value model, the at least one operating-state variable including at least one of (a) vehicle velocity, (b) ambient-air pressure, and (c) engine temperature, wherein the determining of the respective pollutant-limit value includes the provided emission limit-value model receiving as input the at least one operating-state variable and calculating the respective pollutant-limit value using the input at least one operating-state variable;
ascertaining a respective pollutant-concentration variable using a sensor; and
determining occurrence of an error in response to detecting that the ascertained respective pollutant-concentration variable exceeds the respective pollutant-limit value,
wherein the at least one operating-state variable includes the ambient-air pressure.

2. The method of claim 1, wherein the pollutant-limit value varies according to a distance traveled.

3. The method of claim 2, wherein a value of the respective pollutant-concentration variable varies based on the distance traveled.

4. The method of claim 3, wherein a value of the respective pollutant-concentration variable is determined by integrating base values of the respective pollutant-concentration variable across a period of time required by the motor vehicle to travel a predefined driving distance.

5. The method of claim 1, wherein the respective pollutant-limit value includes at least one gradient-limit value, and the error is determined if an absolute value of a gradient of the respective pollutant-concentration variable exceeds the respective gradient-limit value.

6. The method of claim 5, wherein the at least one gradient-limit value is fixedly predefined.

7. The method of claim 5, wherein the at least one gradient-limit value is predefined as a function of the at least one operating-state variables of the motor vehicle.

8. The method of claim 1, further comprising, responsive to the determination of the occurrence of the error:
generating an error signal; and
storing the generated error signal together with associated operating-state variables.

9. The method of claim 1, further comprising, responsive to the determination of the occurrence of the error:
generating an error signal; and
outputting a signal representing the generated error signal.

10. The method as recited in claim 1, wherein the at least one operating-state variable includes the vehicle velocity.

11. The method as recited in claim 1, wherein the at least one operating-state variable includes the engine temperature.

12. The method as recited in claim 1, wherein the at least one operating-state variable includes the vehicle velocity, the ambient-air pressure, and the engine temperature.

13. A control unit for monitoring pollutant emissions during operation of at least one of a combustion engine and an exhaust-after-treatment device in a motor vehicle, the control unit comprising:

a processor; and
at least one interface;
wherein the processor is configured to, for each of at least one pollutant category:
  based on at least one operating-state variable of the motor vehicle obtained via the at least one interface, determine a respective pollutant-limit value using an emission limit-value model, the at least one operating-state variable including at least one of (a) vehicle velocity, (b) ambient-air pressure, and (c) engine temperature, wherein for the determination of the respective pollutant-limit value, the provided emission limit-value model is configured to receive as input the at least one operating-state variable and calculate the respective pollutant-limit value using the input at least one operating-state variable;
  ascertain a respective pollutant-concentration variable based on output of a sensor received via the at least one interface; and
  determine occurrence of an error in response to detecting that the ascertained respective pollutant-concentration variable exceeds the respective pollutant-limit value;
wherein the at least one operating-state variable includes the ambient-air pressure.

14. A non-transitory computer-readable medium on which are stored instructions that are executable by a processor and that, when executed by the processor, cause the processor to perform a method for monitoring pollutant emissions during operation of at least one of a combustion engine and an exhaust-after-treatment device in a motor vehicle, the method comprising:
  for each of at least one pollutant category:
  based on at least one operating-state variable of the motor vehicle, determining a respective pollutant-limit value using a provided emission limit-value model, the at least one operating-state variable including at least one of (a) vehicle velocity, (b) ambient-air pressure, and (c) engine temperature, wherein the determining of the respective pollutant-limit value includes the provided emission limit-value model receiving as input the at least one operating-state variable and calculating the respective pollutant-limit value using the input at least one operating-state variable;
  ascertaining a respective pollutant-concentration variable using a sensor; and
  determining occurrence of an error in response to detecting that the ascertained respective pollutant-concentration variable exceeds the respective pollutant-limit value;
wherein the at least one operating-state variable includes the ambient-air pressure.

* * * * *